UNITED STATES PATENT OFFICE.

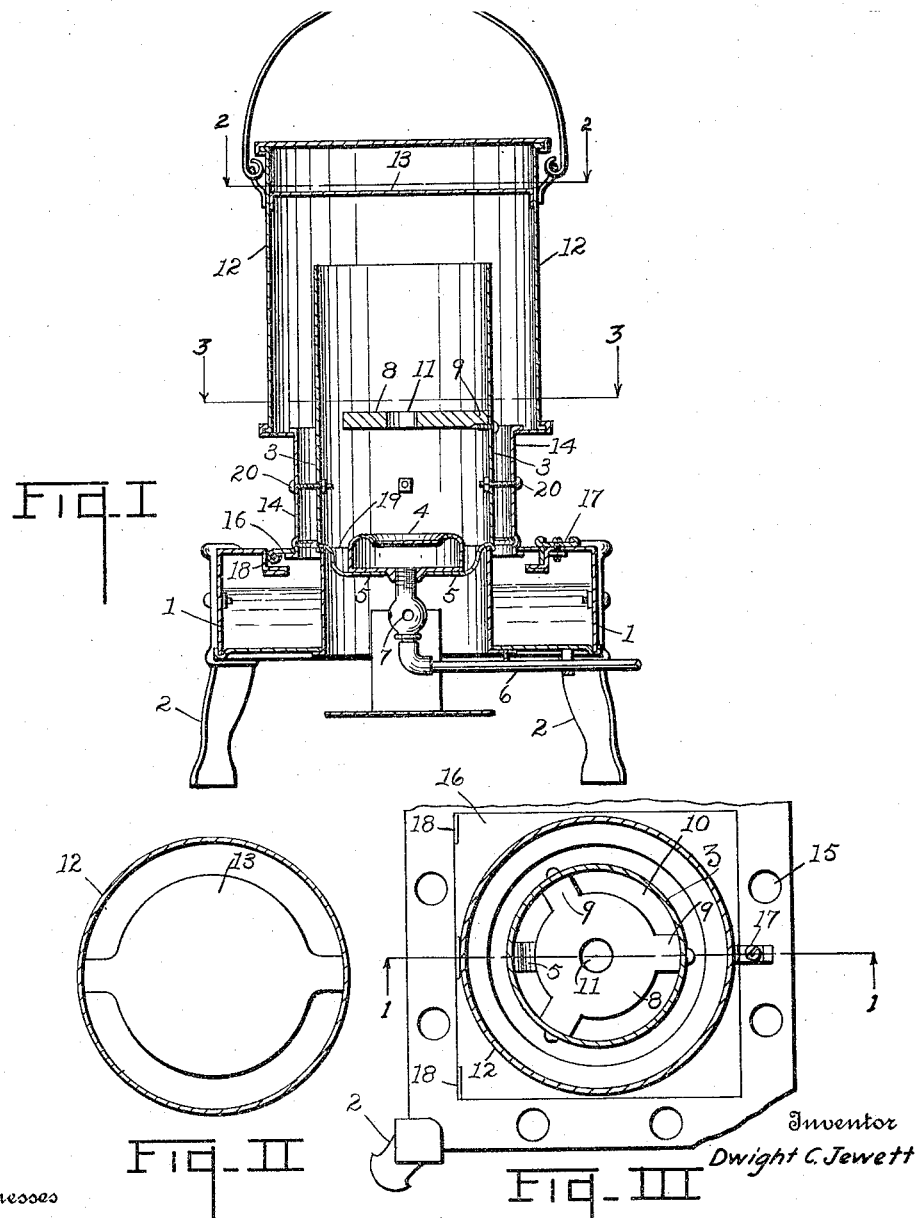

DWIGHT C. JEWETT, OF KALAMAZOO, MICHIGAN.

HEATING-STOVE.

1,280,749. Specification of Letters Patent. Patented Oct. 8, 1918.

Application filed December 26, 1917. Serial No. 208,836.

*To all whom it may concern:*

Be it known that I, DWIGHT C. JEWETT, a citizen of the United States, residing at the city and county of Kalamazoo, State of Michigan, have invented certain new and useful Improvements in Heating-Stoves, of which the following is a specification.

This invention relates to improvements in heating stoves.

The main objects of this invention are:

First, to provide an improved gas burning heating stove in which the hot air discharged is humidified.

Second, to provide an improved gas burning heating stove which is largely odorless.

Third, to provide an improved gas burning heating stove which is very efficient as a heater.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a vertical central section on the line 1—1 of Fig. III of a structure embodying the features of my invention, parts being shown in full lines.

Fig. II is a detail horizontal section on a line corresponding to line 2—2 of Fig. I.

Fig. III is a detail horizontal section on a line corresponding to line 3—3 of Fig. I.

In the drawing similar reference characters refer to similar parts throughout the several views, and the sectional views are taken looking in the direction of the little arrows at the ends of the section lines.

Referring to the drawing, I provide a reservoir 1 constituting a base for the stove, the reservoir being supported by legs 2. Centrally through the reservoir I arrange a tubular burner casing 3. This casing is open at its upper and lower ends. The burner 4 is supported centrally within the casing on the cross piece 5. The gas supply pipe 6 is provided with a suitable air inlet 7.

Within the casing in a spaced relation above the burner I support a metal plate 8 of considerable body, the plate having radial arms 9 secured to the walls of the casing so as to provide air passages 10 around the plate, the plate being also preferably provided with a central opening 11.

Above and embracing the upper end of the burner casing is a drum 12. In diameter this drum considerably exceeds the diameter of the casing so as to provide a substantial space around the upper end of the casing.

A baffle plate 13 is arranged within the drum over the casing, the baffle plate being substantially spaced from the upper end of the casing and also from the top of the drum. The lower end of the drum is connected by the flue 14 to the top of the reservoir. This flue is of such diameter as to provide an annular passage around the casing.

The reservoir has openings 15 for the escape of the heated air and gases. The reservoir has a cover 16 retained by means of the button 17, the cover being hinged at 18. The casing 3 is divided at 19, the upper section being secured to the flue 14 by the bolt 20, so that the upper section will swing back with the drum to expose the burner for lighting and cleaning.

My improved gas stove is very efficient and though comparatively simple and economical in structure and light in weight is strong and durable.

Having thus described my invention, what I claim as new and desire to secure by Letters Patent, is:

1. In a heating stove, the combination of a water reservoir constituting a base, a tubular burner casing disposed through said reservoir, a burner arranged in said casing, a metal plate having a central opening therethrough and disposed in said casing above said burner and in a spaced relation to the walls of the casing, a drum closed at its upper end and embracing the upper end of said casing, a flue surrounding said casing and connecting the lower end of said drum to said reservoir, said reservoir being provided with air openings at its outer edge, and a baffle plate disposed in said drum above said casing and in a spaced relation thereto and to the top of the drum.

2. In a heating stove, the combination of a water reservoir, a burner casing disposed through said reservoir, a burner arranged in said casing, a drum closed at its upper end and disposed over said casing, the lower end of said drum being connected to said reservoir, said reservoir being provided with air escape openings, and a baffle plate disposed in said drum in a spaced relation to the upper end of said casing and the top of the drum.

3. In a heating stove, the combination of a water reservoir, a burner casing disposed through said reservoir, a burner arranged in said casing, a burner plate disposed in said casing above said burner, and a drum closed at its upper end and disposed over said casing, the lower end of said drum being connected to said reservoir so that the discharge from the drum is through said reservoir, said reservoir being provided with air escape openings.

4. In a heating stove, the combination of a water reservoir, a burner casing disposed through said reservoir, a burner arranged in said casing, and a drum closed at its upper end and disposed over said casing, the lower end of said drum being connected to said reservoir by a flue surrounding said casing and providing an annular passage from the drum to the reservoir so that the discharge from the drum is through said reservoir, said reservoir being provided with air escape openings.

In witness whereof, I have hereunto set my hand and seal in the presence of two witnesses.

DWIGHT C. JEWETT. [L. s.]

Witnesses:
 LUELLA G. GREENFIELD,
 MARGARET L. GLASGOW.

Copies of this patent may be obtained for five cents each, by addressing the "Commissioner of Patents, Washington, D. C."